Patented Mar. 17, 1931                                                    1,796,690

UNITED STATES PATENT OFFICE

WILLY O. HERRMANN AND HANS DEUTSCH, OF MUNICH, GERMANY, ASSIGNORS TO CONSORTIUM FUER ELEKTROCHEMISCHE INDUSTRIE, OF MUNICH, GERMANY

METHOD FOR THE PRODUCTION OF ACETALS

No Drawing. Application filed August 23, 1926, Serial No. 131,106, and in Germany August 27, 1925.

If acetylene is allowed to react in the presence of mercury salts on aliphatic monohydric normal alcohols containing not more than three carbon atoms the corresponding acetals are formed. However, when the absorption of acetylene has proceeded far enough to give a considerable concentration of the acetal in the solution a condensation and resinification takes place as shown by discoloration and thickening of the reaction mixture. Furthermore, at about this point the expensive mercury catalyst is acted upon and the catalytically active form is destroyed.

Such limitations have rendered impossible the fullest commercial use of this reaction. We have, however, found that if we operate so that most of the acetal is removed from the reaction vessel continually according to its formation this condensation and the loss of catalyst can be prevented. In order to carry out this invention we operate so as to continually remove the acetal from the solution during its formation. This we can accomplish in several ways; any method which will cause an increased vaporization of the acetal from the solution may be used; of course, a mixture of the acetal and corresponding alcohol is obtained but this mixture can be separated later and the alcohol returned to the reaction vessel. The method of removal may be suited to the boiling points of the ingredients. Thus by the choice of a suitable reaction temperature sufficient vaporization of the alcohol and the acetal may be obtained; further, diminished pressure may be used; we have also utilized vapors of an inert liquid such as benzol or a stream of an inert gas such as nitrogen or carbon dioxide to sweep out the acetal vapors. We preferably, however, use a stream of the reacting gas, acetylene. For this purpose excess acetylene is passed through the reaction mixture in a continuous current at such a rapid rate that only a portion of the acetylene has time to be absorbed and react to form the acetal. The excess acetylene leaving the reaction vessel carries with it alcohol and acetal vapors in an amount dependent on the vapor pressures at the temperature used. Fresh alcohol is added as the reaction proceeds thus causing a continuous production of the acetal without producing an undue concentration of acetal in the reaction vessel.

The vapors coming from the reaction vessel are passed through a condenser and the acetal-alcohol mixture removed while the excess acetylene passes on to be circulated through the reaction system.

The reaction is carried on in a suitable closed vessel preferably equipped with a stirrer, or the necessary agitation can be secured by a special circulating pump, by the moving acetylene gas stream itself rising in the mixture, or a combination of these. The catalyst may be introduced in any suitable way, but we have found it advantageous to introduce it, as needed, in suspension in the replenishing alcohol. The addition of fresh catalyst and alcohol can be continuous or discontinuous depending on the speed of reaction of the particular alcohol. The spent catalyst can be likewise removed and revivified. In operation of the process best results are secured if a check is kept on the catalyst composition and the acetal-alcohol concentration in the reaction liquid. For this purpose samples are frequently tapped off during operation. The reaction liquid may then be continuously or intermittently circulated through a system external to the reaction vessel, purified by any suitable means, i. e. filtered or distilled, and then fresh or purified alcohol and catalyst added, as required, by means of a return line from this external system. The catalyst is used in a finely divided form so that it can be carried about by the circulating alcohol.

We have found that at certain rates of acetylene flow it is possible to maintain a suitable reaction temperature merely by sufficient vaporization without external cooling. It also may be advantageous to use such a great excess of acetylene that a large vaporization takes place and external heating becomes necessary.

Example I

A suspension of 50 grams of finely divided mercury sulfate in 1 liter methanol was heated to about 62° C. and acetylene allowed to flow in with the velocity of about 1 cbm per hour. The excess of the acetylene carried with it a vapor mixture of methanol and dimethylacetal. The vapor mixture was passed through a condenser and the dimethylacetal and methanol removed from the acetylene. This acetylene with fresh acetylene was led back by a circulating pump into the reaction apparatus. Simultaneously about 1 liter of an emulsion of mercury sulfate in methanol containing 50 grams of mercury sulfate per liter was added to the reaction mixture per hour. Fresh methanol was continuously added according to its consumption by the reaction.

Operating in this way about 2 to 2.5 kilo of a reaction product containing 55 to 65% dimethylacetal were produced per hour.

*Example II*

A suspension was first prepared of 50 grams of finely divided mercuric acetate in 1000 grams ethyl alcohol; to this were added 10 grams of concentrated sulphuric acid in 100 grams of alcohol whilst stirring. 1000 grams of this alcohol-acid-cataylst mixture were then placed in an agitated closed vessel and heated to about 75° C. A stream of acetylene gas was then forced through the mixture at the rate of 200 to 300 liters per hour; the reaction mixture was cooled by running water so as to maintain approximately the starting temperature of about 75° C. The acetylene at the above rate of flow was not completely absorbed or reacted in the vessel and the excess passed on carrying with it the vapors of the diethyl acetal formed and vapors of ethyl alcohol. The vapor mixture was passed through a condenser and the diethyl acetal and alcohol removed from the acetylene; the acetylene was then returned to the reaction system. During the run fresh alcohol was continuously added. After operating for a time some of the mercury slimes were removed with some reaction mixture from the bottom of the vessel and fresh cataylst added.

Operating in this way we have produced in 24 hours approximately 8000 grams diethyl acetal, mixed with alcohol, from which the acetal can be isolated for instance by fractionation.

*Example III*

A suspension of 70 grams mercury sulphate in 3 liters of ethyl alcohol with about 8% water was heated to about 70° C. and acetylene allowed to flow in with the velocity of 5 cbm per hour. With the excess of acetylene a vapor mixture of alcohol and acetal with acetaldehyde formed from the water was vaporized, condensed in a cooling apparatus and removed. The acetylene with fresh acetylene was led back by a circulating pump into the reaction apparatus. Simultaneously 2 to 3 liters of an emulsion of mercury sulphate in alcohol containing 8% water and about 46 grams of mercury sulphate per liter were added to the reaction mixture per hour. Fresh 92 per cent alcohol was continuously added according to its consumption by the reaction.

Operating in this way about 7–9 kilos of a reaction product containing about 25 percent diethyl acetal and about 13 percent acetaldehyde were produced per hour.

Furthermore we have found that even in spite of the presence of larger amounts of acetaldehyde, when using alcohols with relatively large quantities of water, it is possible to raise the concentration of acetal in the reaction product by a suitable partial condensation of the distilling vapor mixture and continuously leading back part of the reaction product into the reaction apparatus.

*Example IV*

The process was carried out according to Example III. The reaction vessel however was provided with a fractionating apparatus by which part of the distilling vapors were condensed and carried back into the reaction vessel. 5 to 6 kilos of a product with about 40 percent acetal and about 15 percent acetaldehyde were obtained per hour. By more intensive fractionation it is possible to obtain in one run reaction products with still higher concentrations of acetal.

Furthermore we have found that the content of acetal in the reaction product may very advantageously be raised by leading the reaction product in several runs through the reaction apparatus. A highly concentrated reaction product is especially adaptable for the isolation of pure acetal by fractional distillation.

*Example V*

The reaction product obtained according to Example IV with a percentage of about 40 percent acetal and 15 percent acetaldehyde was once more led through the apparatus according to the foregoing examples. The emulsion of the mercury sulfate however was in this case used about 5 times more concentrated so that a liter of the emulsion contained about 230 grams of mercury sulphate and only 0.4 to 0.6 liters of this emulsion were added per hour. 6 to 7 kilos of the 40 per cent product were used per hour and a reaction product with 62 percent acetal and about 16 percent acetaldehyde was obtained. Besides the concentration about 2 to 2.5 kilo of fresh acetal were formed per hour.

If it is desired to get from hydrous alcohols directly reaction products with a low content of acetaldehyde it is advantageous to work in the following manner. The distilling reaction product is condensed at a relatively high temperature so that the acetaldehyde is not condensed. This acetaldehyde is condensed from the circulating acetylene together with non condensed alcohol in a second condensing apparatus and is obtained from this condensate by fractionation. In working in this manner the aldehyde not condensed in the first condenser may also be obtained from the circulating gas by washing it out with a liquid preferably with the alcohol used.

It may also be advantageous to remove the acetaldehyde from the reaction product by fractional distillation and to lead back the raw acetal into the reaction process.

*Example VI*

A suspension was first prepared of 50 grams of finely divided mercuric sulphate in 1 liter n-propyl-alcohol. This suspension was heated to about 75° and acetylene allowed to flow in with the velocity of about 600 liter per hour. The excess of the acetylene carried with it a vapor mixture of dipropylacetal and propyl alcohol. This vapor mixture was passed through a condenser and the dipropylacetal and propyl alcohol removed from the acetylene. The acetylene together with fresh acetylene was led back by a circulating pump into the reaction apparatus. Simultaneously about 1 liter of an emulsion of mercury sulphate in n-propyl alcohol containing 50 grams of mercury sulphate per liter was added to the reaction mixture per hour. Fresh n-propyl alcohol was continuously added according to its consumption by the reaction.

Operating in this way about 1 to 1.5 kilo of a reaction product containing 10 to 15% n-dipropylacetal were produced per hour.

The above operations are typical for the operation of our process. However, we do not wish to be limited to these nor do we wish to be limited to any one method for removal of the acetal from the solution nor the removal of catalyst and subsequent replenishments.

What we claim is:

1. A process of producing acetals of aliphatic mono-hydric normal alcohols with not more than three carbon atoms which comprises causing acetylene to react upon said alcohol in the presence of a mercury salt and continuously removing said acetal and alcohol vapors from the reaction liquid.

2. A process of producing acetals of aliphatic monohydric normal alcohols with not more than three carbon atoms which comprises causing acetylene to react upon said alcohol in the presence of a mercury salt and continuously removing said acetal and alcohol vapors from the reaction liquid at such rate that the concentration of said acetal in the reaction liquid remains substantially below that at which resinification occurs.

3. A process of producing acetals of aliphatic mono-hydric normal hydrous alcohols with not more than three carbon atoms which comprises causing acetylene to react upon said alcohol in the presence of a mercury salt and continuously removing said acetal and alcohol vapors from the reaction liquid.

4. A process of producing acetals of aliphatic mono-hydric normal alcohols with not more than three carbon atoms which comprises causing acetylene to react upon said alcohol in the presence of a mercury salt and continuously removing said acetal and alcohol vapors from the reaction liquid by vaporization.

5. A process of producing acetals of aliphatic mono-hydric normal alcohols with not more than three carbon atoms which comprises causing acetylene to react upon said alcohol in the presence of a mercury salt and continuously removing said acetal and alcohol vapors from the reaction liquid by vaporization under diminished partial pressure of the acetal.

6. A process of producing acetals of aliphatic monohydric normal alcohols with not more than three carbon atoms which comprises causing acetylene to react upon said alcohol in the presence of a mercury salt and continuously removing said acetal and alcohol vapors from the reaction liquid by means of excess acetylene passing therethrough.

7. The process of producing acetals comprising passing acetylene in excess continuously through an aliphatic monohydric normal alcohol with not more than three carbon atoms heated to a temperature of about its boiling point and containing a mercury salt catalyst.

8. The process of manufacturing acetals which consists in causing excess acetylene to continuously pass through a heated aliphatic, monohydric normal alcohol with not more than three carbon atoms in the presence of a mercury salt at such a rate that the vapors of the major portion of the acetal formed and alcohol vapors are removed by the outflow of excess acetylene.

9. The process of manufacturing acetals which consists in causing excess acetylene to continuously pass through a heated aliphatic, monohydric normal alcohol with not more than three carbon atoms in the presence of a mercury salt at such a rate that the outflow of excess acetylene removes said acetal and alcohol vapors in sufficient amount that the concentration of said acetal in the reaction liquid remains substantially below that at which resinification occurs.

10. The process of manufacturing acetals which consists in causing excess acetylene to continuously pass through a heated aliphatic, monohydric, normal alcohol with not more than three carbon atoms in the presence of a mercury salt at such a rate that the vapors of the major portion of the acetal formed and alcohol vapors are removed by the outflow of excess acetylene at such a rate that the excess heat of reaction is approximately compensated by the vaporization.

11. A process of producing acetals of aliphatic monohydric normal alcohols with not more than three carbon atoms which comprises causing acetylene to react upon said alcohol in the presence of a mercury salt and continuously removing said acetal and alcohol vapors from the reaction liquid by means of excess acetylene passing therethrough, condensing the vapors of the acetal and alcohol and returning the separated acetylene to the reaction vessel.

12. A process of producing acetals of aliphatic monohydric normal alcohols with not more than three carbon atoms containing water which comprises causing acetylene to react upon said alcohol in the presence of a mercury salt and continuously removing said acetal and alcohol vapors from the reaction liquid by means of excess acetylene passing therethrough, condensing from the acetylene passing therethrough the bulk of the acetal separately from the bulk of aldehyde formed as a by-product and returning the separated acetylene to the reaction vessel.

13. A process of producing acetals of aliphatic monohydric normal alcohols with not more than three carbon atoms which comprises causing acetylene to react upon said alcohol in the presence of a mercury salt, continuously removing said acetal and alcohol vapors from the reaction liquid by vaporization, condensing the acetal and alcohol vapors, and returning said condensed vapors to the reaction liquid repeatedly without addition of fresh alcohol to increase the concentration of acetal in the condensed vapors.

14. A process of producing acetals of aliphatic monohydric normal alcohols with not more than three carbon atoms which comprises causing acetylene to react upon said alcohol in the presence of a mercury salt, continuously removing said acetal and alcohol vapors from the reaction liquid, circulating the reaction mixture through a system external to the reaction vessel, controlling and regulating the mercury salt content of said reaction mixture, and leading said reaction mixture back in the reaction vessel.

WILLY O. HERRMANN.
HANS DEUTSCH.